United States Patent
Fukunaga et al.

(10) Patent No.: US 6,942,946 B2
(45) Date of Patent: Sep. 13, 2005

(54) POSITIVE ELECTRODE FOR NON-AQUEOUS ELECTROLYTE SECONDARY BATTERY AND METHOD OF PRODUCING THE SAME

(75) Inventors: Masao Fukunaga, Osaka (JP); Takao Kuromiya, Kadoma (JP); Kazunori Kubota, Moriguchi (JP); Kohei Suzuki, Yao (JP); Tsumoru Ohata, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 322 days.

(21) Appl. No.: 10/202,420

(22) Filed: Jul. 23, 2002

(65) Prior Publication Data

US 2003/0068551 A1 Apr. 10, 2003

(30) Foreign Application Priority Data

Aug. 2, 2001 (JP) ....................................... 2001-235448

(51) Int. Cl.$^7$ ............................................... H01M 4/62
(52) U.S. Cl. ........................ 429/217; 429/233; 429/232; 252/182.1; 427/58
(58) Field of Search ............................... 429/217, 233, 429/232; 252/182.1; 427/58

(56) References Cited

U.S. PATENT DOCUMENTS

| | | | |
|---|---|---|---|
| 4,455,358 A | | 6/1984 | Graham et al. |
| 4,681,698 A | | 7/1987 | Graham et al. |
| 5,595,841 A | * | 1/1997 | Suzuki ........................ 429/217 |
| 2004/0020763 A1 | * | 2/2004 | Kanzaki et al. ............. 204/250 |

FOREIGN PATENT DOCUMENTS

| | | | |
|---|---|---|---|
| FR | 2 472 845 | | 7/1981 |
| JP | 58-066269 A | | 4/1983 |
| JP | 01-151158 A | | 6/1989 |
| JP | 11-283628 | * | 10/1999 |
| JP | 2000-106186 A | | 4/2000 |
| JP | 2000-106189 A | | 4/2000 |
| JP | 2000-348713 A | | 12/2000 |
| JP | 2001-332265 | | 11/2001 |

* cited by examiner

*Primary Examiner*—Laura Weiner
(74) *Attorney, Agent, or Firm*—Akin Gump Strauss Hauer & Feld, LLP

(57) ABSTRACT

Disclosed is a positive electrode for a non-aqueous electrolyte secondary battery, comprising: a positive electrode mixture layer; and a positive electrode current collector which carries the positive electrode mixture layer, with the positive electrode mixture layer comprising: at least one positive electrode active material; at least one conductive agent; at least one binder; and at least one thickening agent, and the thickening agent comprising a polymer containing at least one acrylonitrile unit and at least one —$(CH_2)_n$— structure portion where $6 \leq n$.

10 Claims, 1 Drawing Sheet

POSITIVE ELECTRODE FOR NON-AQUEOUS ELECTROLYTE SECONDARY BATTERY AND METHOD OF PRODUCING THE SAME

BACKGROUND OF THE INVENTION

A non-aqueous electrolyte secondary battery comprises a positive electrode, a negative electrode and a non-aqueous electrolyte. The positive electrode comprises: a positive electrode mixture layer comprising a positive electrode active material, a conductive agent, a binder and a thickening agent; and a positive electrode current collector carrying the positive electrode mixture layer. The negative electrode comprises: a negative electrode mixture layer comprising a negative electrode material, a binder and the like; and a negative electrode current collector carrying the negative electrode mixture layer.

The positive electrode mixture layer and negative electrode mixture layer are formed by applying, to the respective current collectors, pastes each comprising a mixture of the starting materials and a polar dispersion medium. An aqueous dispersion medium or a polar organic dispersion medium is used as the polar dispersion medium. However, the use of an aqueous dispersion medium causes water to remain in the electrode plates, and thus is likely to induce generation of hydrogen gas inside the battery. For this reason, a polar organic dispersion medium such as N-methyl-2-pyrrolidone (hereinafter referred to as NMP) is more often employed than an aqueous dispersion medium.

Heretofore, poly(vinylidene fluoride) (hereinafter referred to as PVDF), polytetrafluoroethylene (hereinafter referred to as PTFE) and the like are employed as the binder for the positive electrode mixture layer. From the viewpoint of making PVDF, PTFE and the like to sufficiently function as the binder, they are added in a large amount to the positive electrode mixture. However, when the positive electrode contains a large amount of the binder, an electroconductive network is not sufficiently formed in the positive electrode. Accordingly, it is also necessary to use a large amount of a conductive agent typified by carbon black. Naturally, there is a certain limit to increase the capacity of a battery by improving the active material density of the positive electrode mixture layer. The active material density as used herein is calculated by dividing the weight of the positive electrode active material contained in the positive electrode mixture layer by the volume of the positive electrode active material layer.

The present inventors have discovered that it is effective to employ a particulate binder, which is insoluble in a dispersion medium of a paste but capable of being dispersed therein, in order to improve the active material density. For example, rubber particles comprising a copolymer of 2-ethylhexylacrylate, acrylic acid and acrylonitrile may be used as the above-mentioned binder. In this case, the amount of the binder can be significantly reduced, so that it becomes possible to improve the active material density of the positive electrode.

Herein, the particulate binder is insoluble in the dispersion medium, and therefore does not function to control the viscosity of the paste. Accordingly, it is necessary to add a small amount of a thickening agent with the paste. The thickening agent is required to have a certain polarity so that it can be dissolved in the dispersion medium of the paste. For example, a polar resin, such as an acrylic resin having a hydroxyl group, may be employed as such thickening agent.

Since the polar resin has high affinity with a polar dispersion medium such as NMP, it is possible to control the properties of the paste with a small amount of the polar resin. The polar resin, however, is likely to retain water because of its high hydrophilicity. Water is difficult to be removed by a drying step during the production process of an electrode plate, and thus remains inside the positive electrode even after the fabrication of the battery. The residual water may result in generation of hydrogen gas at the negative electrode side during charging of the battery, causing problems such as the swelling of the battery.

SUMMARY OF THE INVENTION

In view of the foregoing problems, it is an object of the present invention to provide a non-aqueous electrolyte secondary battery having a high capacity with reduced gas generation. The non-aqueous electrolyte secondary battery with reduced gas generation has also an excellent capacity retention rate.

More specifically, the present invention relates to a positive electrode for a non-aqueous electrolyte secondary battery, comprising:

a positive electrode mixture layer; and a positive electrode current collector which carries the positive electrode mixture layer, with the positive electrode mixture layer comprising: at least one positive electrode active material; at least one conductive agent; at least one binder; and at least one thickening agent, and the thickening agent comprising a polymer containing at least one acrylonitrile unit and at least one —$(CH_2)_n$— structure portion where $6 \leq n$.

It is preferable that the amount of the thickening agent contained in the positive electrode mixture layer is not less than 0.1 part by weight and not more than 1 part by weight per 100 parts by weight of the positive electrode active material.

It is preferable that the binder is a particulate binder comprising a cross-linked polymer.

It is preferable that the total amount of the binder and the thickening agent contained in the positive electrode mixture layer is not less than 0.4 part by weight and not more than 1.4 parts by weight per 100 parts by weight of the positive electrode active material.

It is preferable that the thickening agent has a solubility parameter δ at 25° C. of not less than 8.3 and not more than 13.5, with the parameter being defined by the equation:

$$\delta = (\Delta H/V)^{1/2}$$

where ΔH is a molar heat of vaporization and V is a molar volume.

It is preferable that the amount of the conductive agent contained in the positive electrode mixture layer is not less than 1 part by weight and not more than 3 parts by weight per 100 parts by weight of the positive electrode active material.

It is preferable that an active material density, which is calculated by dividing the amount of the positive electrode active material contained in the positive electrode mixture layer by the volume of the positive electrode mixture layer, is not less than 3.45 g/ml and not more than 3.85 g/ml.

The present invention also relates to a method of producing a positive electrode for a non-aqueous electrolyte secondary battery, the method comprising the steps of:

(1) mixing at least one positive electrode active material, at least one binder and at least one dispersion medium to give a paste A;

(2) mixing at least one conductive agent, at least one thickening agent and at least one dispersion medium to give a paste B wherein the conductive agent is dispersed to have a mean median size of not less than 0.2 µm and not more than 1 µm;

(3) mixing the paste A with the paste B to give a paste C; and (4) applying the paste C to a positive electrode current collector to form an electrode plate.

In the above-described production method, it is preferable that the binder is a particulate binder comprising a cross-linked polymer.

In the above-described production method, it is preferable that the thickening agent comprises a polymer containing at least one acrylonitrile unit and at least one —$(CH_2)_n$— structure portion where $6 \leq n$.

It is preferable that the amount of the conductive agent contained in the paste C is not less than 1 part by weight and not more than 3 parts by weight per 100 parts by weight of the positive electrode active material.

It is preferable that the amount of the thickening agent contained in the paste C is not less than 0.1 part by weight and not more than 1 part by weight per 100 parts by weight of the positive electrode active material.

In the above-described production method, it is preferable that the thickening agent has a solubility parameter δ at 25° C. of not less than 8.3 and not more than 13.5, with the parameter being defined by the equation:

$$\delta = (\Delta H/V)^{1/2}$$

where ΔH is a molar heat of vaporization and V is a molar volume.

It is preferable that the amount of water contained in the paste C is not more than 10000 ppm.

Further, the present invention relates to a non-aqueous electrolyte secondary battery, comprising:

the above-described positive electrode; a negative electrode; a separator interposed between the positive electrode and negative electrode; and a non-aqueous electrolyte.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
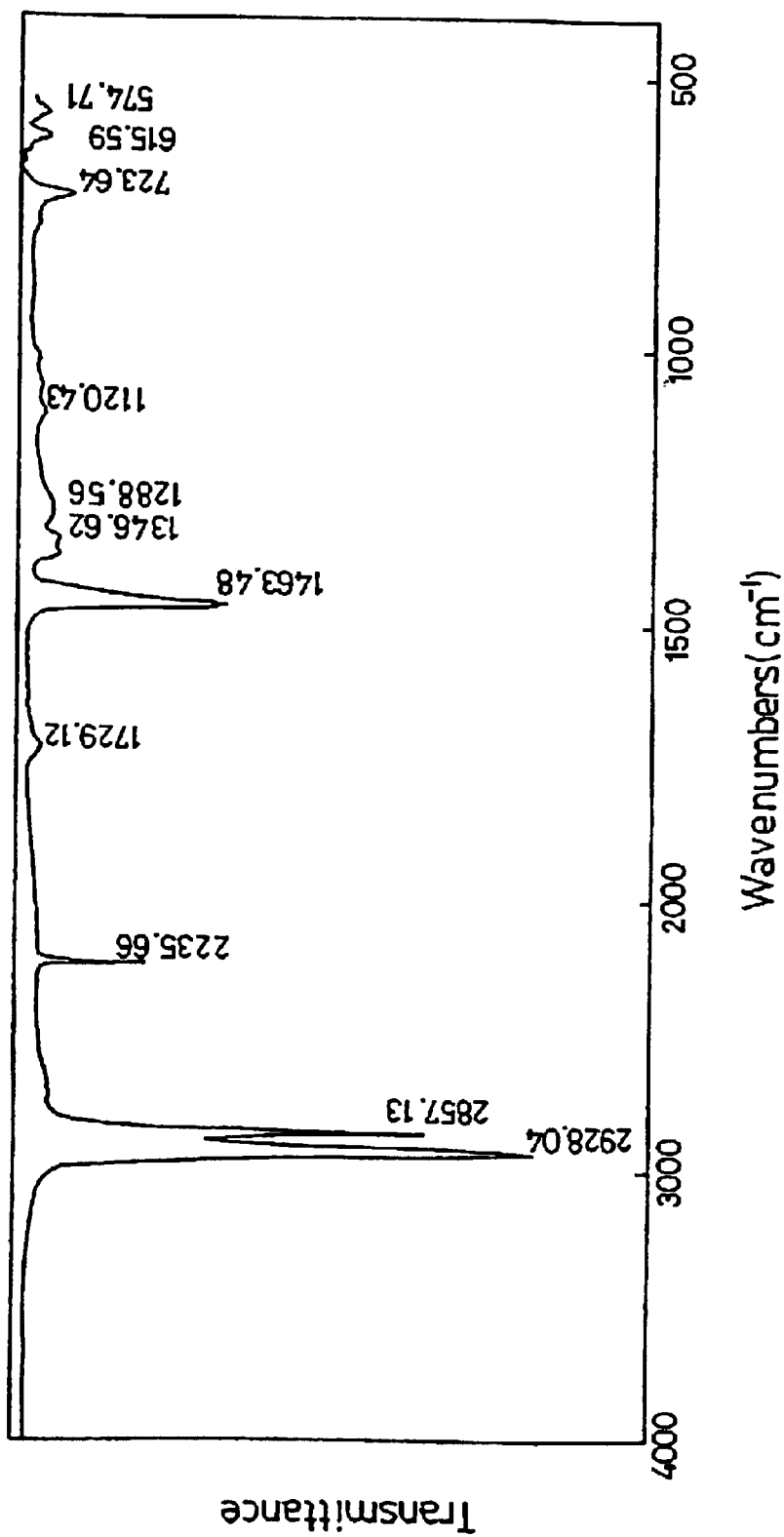
FIG. 1 shows an infrared spectrum of an example of a thickening agent comprising a polymer which contains acrylonitrile units and —$(CH_2)_n$— structure portions.

The positive electrode in accordance with the present invention comprises: a positive electrode mixture layer containing a conductive agent, a binder and a thickening agent; and a positive electrode current collector which carries the positive electrode mixture layer.

A composite oxide of lithium and a transition metal, for example, may be used as the positive electrode active material, although there is no specific limitation. Lithium cobaltate, lithium nickelate, lithium manganate and the like, for example, may be used as the composite oxide. These may be used alone or in combination of two or more of them.

Carbon black, graphite and the like, for example, may be used as the conductive agent, although there is no specific limitation. These may be used alone or in combination of two or more of them. For example, acetylene black may be employed as the carbon black.

Particles insoluble in a polar dispersion medium may preferably be used as the binder. The particles insoluble in a polar dispersion medium are able to maintain their particulate structures in the positive electrode mixture layer, so that they can sufficiently function as the binder even in a small amount. When the amount of the binder contained in the positive electrode mixture is decreased, the active material density is increased, which is calculated by dividing the amount of the positive electrode active material contained in the positive electrode mixture layer by the volume of the positive electrode mixture layer.

Rubber particles containing no fluorine atom may preferably be used as the particulate binder. Although there is no specific limitation, acrylic rubber particles comprising an acrylonitrile unit may preferably be used as the rubber particles. For example, acrylic rubber particles comprising a copolymer of 2-ethylhexylacrylate, acrylic acid and acrylonitrile may be employed. Specific examples include BM500B (trade name), manufactured by Nippon Zeon Co., Ltd.

A polymer containing at least one acrylonitrile unit and at least one —$(CH_2)_n$— structure portion (where $6 \leq = n$) may preferably be used as the thickening agent. The polymer has a polarity suitable to be dispersed in a polar organic dispersion medium. Moreover, since the polymer has a moderate polarity, it has a relatively low affinity with water and thus is less likely to retain water. Therefore, gas generation inside the battery is reduced even at high temperatures. Specific examples of such thickening agent include BM720H (trade name), manufactured by Nippon Zeon Co., Ltd.

The acrylonitrile unit contributes mainly to achieve a moderate polarity of the thickening agent, whereas the —$(CH_2)_n$— structure portion in which six or more methylene groups are aligned in a straight chain, contributes mainly to achieve the thickening effect of the thickening agent.

The structure of the thickening agent may be identified by infrared spectrum.

FIG. 1 shows an infrared spectrum of an example of the thickening agent that can be used in the present invention. In FIG. 1, the absorption peak observed near 2235.66 $cm^{-1}$ is attributed to the acrylonitrile unit.

The absorption peak observed near 723.64 $cm^{-1}$ is attributed to the —$(CH_2)_n$— structure portion in which six or more methylene groups are aligned in a straight chain. This absorption peak is attributed to the rocking vibration of the above-mentioned structure.

It is preferable that the thickening agent has a solubility parameter δ at 25° C. of not less than 8.3 and not more than 13.5, with the parameter being defined by the equation:

$$\delta = (\Delta H/V)^{1/2}$$

where ΔH is a molar heat of vaporization and V is a molar volume. The solubility parameter δ as used herein represents the polarity of an organic material. The solubility parameter δ can be easily calculated from values assigned to respective portions of the molecule. The polarity of the organic material can also be evaluated empirically based on, for example, its solubility in various organic solvents. A solubility parameter δ obtained by calculation shows a good correlation with the empirical evaluation.

In the polymer containing at least one acrylonitrile unit and at least one —$(CH_2)_n$— structure portion (where $6 \leq n$), the value of δ can be substantially controlled by varying the content of the acrylonitrile unit.

A molecule containing a polar group such as a hydroxyl group and a carboxyl group, has a high value of δ. Conversely, a molecule composed only of a low polar group such as an ethyl group and a methyl group, has a low value of δ. A polymer having a δ value of less than 8.3 has poor wettability with a polar organic dispersion medium such as NMP, and therefore renders it difficult to prepare a paste. On the other hand, a polymer having a δ value of more than 13.5 has an excessively high hydrophilicity, and thus is likely to retain a water molecule, resulting in hydrogen gas generation within the battery during charging.

It is preferable that the amount of the thickening agent contained in the positive electrode mixture layer is not less than 0.1 part by weight and not more than 1 part by weight per 100 parts by weight of the positive electrode active material. When the amount of the thickening agent is less than 0.1 part by weight, it is difficult to prepare a paste comprising the starting materials of the positive electrode mixture layer and the dispersion medium. On the other hand, when the amount of the thickening agent exceeds 1.0 part by weight, the thickening agent does not participate in the battery reaction, so that the capacity of the battery is undesirably decreased.

It is preferable that the total amount of the binder and the thickening agent contained in the positive electrode mixture layer is not less than 0.4 part by weight and not more than 1.4 parts by weight per 100 parts by weight of the positive electrode active material. When the total amount of the binder and the thickening agent is less than 0.4 part by weight, the positive electrode mixture layer is likely to be separated from the electrode plate. On the other hand, when the total amount of the binder and the thickening agent exceeds 1.4 parts by weight, the charge/discharge reaction in the battery is hindered.

The ratio of the amount of the binder to the amount of the thickening agent contained in the positive electrode mixture layer depends on, for example, the shape, surface area and amount of the active material, conductive agent and the like, each used in the positive electrode mixture layer. Accordingly, the ratio of the amount of the binder to the amount of the thickening agent may be freely determined in view of achieving the stability of the paste and the cohesiveness of the positive electrode mixture layer. However, when the ratio of the amount of the binder to the amount of the thickening agent falls outside of the range of 1:3 to 3:1, it becomes difficult to keep the dispersibility of the conductive agent in a good condition.

It is preferable that the amount of the conductive agent contained in the positive electrode mixture layer is 1 to 3 parts by weight per 100 parts by weight of the positive electrode active material. When the amount of the conductive agent is less than 1 part by weight, the conductivity is reduced in the positive electrode mixture layer, resulting in a reduced capacity retention rate. On the other hand, when the amount of the conductive agent exceeds 3 parts by weight, the conductive agent does not participate in the battery reaction, so that the battery capacity is decreased.

According to the present invention, it is possible to control the active material density of the positive electrode mixture layer at not less than 3.45 g/ml and not more than 3.85 g/ml. When the active material density is less than 3.45 g/ml, the electroconductive network in the positive electrode mixture layer is difficult to be maintained for a long time, which may result in a shorter cycle life or an insufficient capacity of the battery. On the other hand, when the active material density exceeds 3.85 g/ml, the electrolyte is difficult to be retained in the positive electrode mixture layer. In order to yield an excellent high-rate discharge characteristic, it is more preferable that the active material density of the positive electrode mixture layer is 3.55 to 3.8 g/ml.

Next, descriptions will be made on a preferred mode of the method of producing a positive electrode comprising the following steps (1) to (4).

In step (1), a positive electrode active material and a binder are mixed to prepare a paste A. In step (2), a conductive agent and a thickening agent are mixed to prepare a paste B in which the conductive agent has a mean median size of not less than 0.2 μm and not more than 1 μm. In step (3), the paste A is mixed with the paste B to prepare a paste C. In step (4), the paste C is applied to a positive electrode current collector, and the whole is dried and then pressed to form an electrode plate.

From the viewpoint of improving the active material density of the positive electrode mixture layer, it is preferable to use, as the binder used in step (1), rubber particles which are insoluble in a polar organic dispersion medium and which can function well as the binder in a small amount. As the rubber particles, a copolymer of 2-ethylhexylacrylate, acrylic acid and acrylonitrile may preferably be used.

In general, the conductive agent used in step (2), such as carbon black, is flocculated and therefore has a median size of several micrometers. However, when the median size of the conductive agent is greater than 1 μm, the conductive agent associates with water and is re-flocculated in the subsequent step. As a result, the positive electrode is likely to contain water and, moreover, the flocculation of the conductive agent renders it difficult to produce a positive electrode having a uniform weight distribution. On the other hand, when the median size of the conductive agent is less than 0.2 μm, the conductive agent is overdispersed, so that the conductivity of the positive electrode is reduced to result in a shortened cycle life of the battery.

Therefore, in order to produce a positive electrode having excellent properties, it is effective to control the mean median size of the conductive agent at not less than 0.2 μm and not more than 1 μm. When the mean median size of the conductive agent is reduced to not less than 0.2 μm and not more than 1 μm, it becomes difficult for the conductive agent to associate with water even by the exposure to water in the subsequent step. This enables the production of a positive electrode having a uniform weight distribution, while minimizing the intake of water into the battery. With the use of the positive electrode having a uniform weight distribution, it is possible to obviate a trouble caused by deposition of lithium in the negative electrode.

When dispersing the conductive agent to have a mean median size of not less than 0.2 μm and not more than 1 μm, it is necessary to avoid as much as possible to apply shearing force to the conductive agent in the presence of the positive electrode active material. If the positive electrode active material is mixed with the conductive agent and then kneaded with the conductive agent until the conductive agent has a mean median size of not less than 0.2 μm and not more than 1 μm, the particles of the positive electrode active material collide with the conductive agent to be pulverized, thereby making it impossible to produce a battery having well-balanced properties.

Therefore, in step (2), the conductive agent is previously mixed with the thickening agent to prepare a paste B in which the conductive agent is well dispersed. Then, the paste B is mixed with the paste A to prevent the destruction of the active material particles. Herein, the thickening agent is used as the component to be mixed with the conductive agent, because the thickening effect of the thickening agent causes a strong shearing force to be exerted to the paste B, thereby facilitating an effective dispersion of the conductive agent.

When a polymer containing at least one acrylonitrile unit and at least one —$(CH_2)_n$— structure portion is used as the thickening agent for the preparation of the paste B, the amount of water intake into the positive electrode is further reduced. Accordingly, the swelling of the battery is much less likely to occur during charging and discharging.

For the preparation of the paste B, it is preferable to employ a polar organic dispersion medium such as NMP.

Although there is no specific limitation, a beads mill, paint shaker, kneader, three roll mill, two roll mill and the like, for example, may be employed for the preparation of the paste B.

It is preferable that the amount of the conductive agent contained in the paste C is not less than 1 part by weight and not more than 3 parts by weight per 100 parts by weight of the positive electrode active material. When the amount of the conductive agent is less than 1 part by weight, the conductivity is reduced in the positive electrode mixture layer, resulting in a reduced capacity retention rate of the battery. On the other hand, when the amount of the conductive agent exceeds 3 parts by weight, the active material density of the positive electrode mixture layer is decreased, so that the battery capacity is decreased.

It is preferable that the amount of the thickening agent contained in the paste C is not less than 0.1 part by weight and not more than 1 part by weight per 100 parts by weight of the positive electrode active material. When the amount of the thickening agent is less than 0.1 part by weight, it is difficult to prepare the paste C. On the other hand, when the amount of the thickening agent exceeds 1.0 part by weight, the active material density of the positive electrode mixture layer is decreased, so that the battery capacity is decreased.

The amount of water contained in the paste C may be controlled preferably at not more than 10000 ppm, more preferably at not more than 5000 ppm. When the amount of water exceeds 10000 ppm, the dispersibility in the paste C of the conductive agent is rapidly reduced, so that the conductive agent is likely to be re-flocculated. As a result, the viscosity of the paste C is increased, which renders it difficult to uniformly apply the paste C to the current collector.

For the application of the paste C to the current collector, a die coater, pipe doctor coater, reverse roll coater and the like, for example, may be used.

The negative electrode used in the present invention comprises: a negative electrode mixture layer containing a negative electrode material, a binder and the like; and a negative electrode current collector carrying the negative electrode mixture layer.

Although there is no specific limitation, an organic polymer compound, a carbon material obtained by baking cokes, pitch or the like, graphites such as artificial graphite and natural graphite, for example, may be used as the negative electrode material. Phenolic resin, polyacrylonitrile, cellulose and the like may be employed as the organic polymer compound.

Any conventionally used material may be employed as the binder and other ingredient without any specific limitation. Similarly, any conventionally used steps may be employed for the production of the negative electrode.

The non-aqueous electrolyte used in the present invention may be prepared by dissolving a solute in a non-aqueous solvent. As the non-aqueous solvent, for example, ethylene carbonate, propylene carbonate, butylene carbonate, ethyl methyl carbonate, dimethyl carbonate, diethyl carbonate, γ-butyrolactone, 1,2-dimethoxyethane, 1,2-dichloroethane, 1,3-dimethoxyethane, 4-methyl-2-pentanone, 1,4-dioxane, acetonitrile, propionitrile, butyronitrile, valeronitrile, benzonitrile, sulfolane, 3-methyl-sulfolane, tetrahydrofuran, 2-methyltetrahydrofuran, diethylformamide, dimethyl sulfoxide, dimethylformamide, trimethyl phosphate and triethyl phosphate may be used. These may be used alone or in combination of two or more of them.

As the solute, lithium salts such as lithium perchlorate, $LiPF_6$, $LiBF_4$, lithium trifluoromethylsulfonate and lithium bis(trifluoromethylsulfonyl)imide may be used. These may be used alone or in combination of two or more of them.

In the following, the present invention will be described in further detail with reference to examples.

EXAMPLE 1

In the following experiments, it was examined whether or not the paste C1 could be prepared and whether or not the positive electrode mixture layer was separated from the electrode plate. Subsequently, each of the obtained batteries was evaluated for the initial capacity, high-rate discharge characteristic, capacity retention rate and amount of gas generation.

Battery 1

(i) Preparation of Paste A1

Lithium cobaltate was used as the positive electrode active material. Rubber particles (BM500B, manufactured by Nippon Zeon Co., Ltd., hereinafter referred to as binder A) comprising a copolymer of 2-ethylhexylacrylate, acrylic acid and acrylonitrile was used as the binder. NMP was used as the dispersion medium. 100 g of lithium cobaltate, 0.4 g of a binder A and a proper amount of NMP were mixed to prepare a paste A1 with a solid content of 84 wt %.

(ii) Preparation of Paste B1

A copolymer (hereinafter referred to as thickening agent A1) containing acrylonitrile units and —$(CH_2)_n$— structure portions (where $6 \leq n$) was used as the thickening agent. The ratio of the —$(CH_2)_n$— portion to the acrylonitrile unit was adjusted such that the solubility parameter δ was 9.5. Acetylene black was used as the conductive agent. 0.4 g of a thickening agent A1, 2 g of acetylene black and a proper amount of NMP were mixed to prepare a paste B1 with a solid content of 20 wt % in which the conductive agent had a mean median size of 0.5 µm.

(iii) Preparation of Paste C1

The paste A1 was mixed with the paste $B_1$ to prepare a paste C1.

The preparations of the pastes A1 to C1 were performed in dry air to control the amount of water contained in the paste C1 at 3000 ppm.

(iv) Application of Paste C1

The paste C1 was applied on both surfaces of a positive electrode current collector comprising aluminum foil, and the whole was dried, then pressed into a predetermined thickness and cut into a predetermined size, thereby completing a positive electrode plate. The active material density, which was calculated by dividing the weight of the positive electrode active material contained in the positive electrode mixture layer by the volume of the positive electrode active material layer, was adjusted to 3.65 g/ml. Herein, the application of the paste C1 was performed in dry air.

(v) Preparation of Negative Electrode Plate

A bulk artificial graphite was used as the negative electrode material. A styrene-butadiene-methacrylate copolymer was used as the binder. Carboxymethyl cellulose was used as the thickening agent. Water was used as the dispersion medium. 100 g of the bulk artificial graphite, 1 g of the styrene-butadiene-methacrylate copolymer, 1 g of carboxymethyl cellulose and a proper amount of water were mixed to prepare a negative electrode mixture paste. The negative electrode mixture paste thus prepared was applied onto both surfaces of a negative electrode current collector comprising copper foil, and the whole was dried, then pressed into a predetermined thickness and cut into a predetermined size, thereby completing a negative electrode plate.

(vi) Production of Secondary Battery

The positive electrode plate and negative electrode plate thus produced were spirally wound, with a polyethylene separator having a thickness of 20 µm interposed therebetween, thereby forming an electrode assembly having an oblong cross section. The electrode assembly was inserted into a square battery can made of aluminium, having a thickness of 5 mm, a width of 30 mm and a height of 48 mm. Subsequently, an electrolyte was injected into the battery can to give a non-aqueous electrolyte secondary battery having a capacity of approximately 750 mAh. The electrolyte was prepared by dissolving $LiPF_6$ at a concentration of 0.95 mol/L in a mixed solvent of ethylene carbonate, ethyl methyl carbonate and diethyl carbonate at a volume ratio of 1:1:1. The thickness of the electrode assembly was adjusted to 95% of the inner dimension of the square battery can. Additionally, the porosity of the positive electrode plate was adjusted to 20%. Accordingly, in the following examples, the theoretical capacity varies a little from one battery to another.

Battery 2

A non-aqueous electrolyte secondary battery was produced using the same materials and processes as Battery 1, except for using a copolymer (hereinafter referred to as thickening agent A2) in which the ratio of the $—(CH_2)_n—$ portion to the acrylonitrile unit was adjusted such that the solubility parameter δ was 8.3.

Battery 3

A non-aqueous electrolyte secondary battery was produced using the same materials and processes as Battery 1, except for using a copolymer (hereinafter referred to as thickening agent A3) in which the ratio of the $—(CH_2)_n—$ portion to the acrylonitrile unit was adjusted such that the solubility parameter δ was 11.3.

Battery 4

A non-aqueous electrolyte secondary battery was produced using the same materials and processes as Battery 1, except for using a copolymer (hereinafter referred to as thickening agent A4) in which the ratio of the $—(CH_2)_n—$ portion to the acrylonitrile unit was adjusted such that the solubility parameter δ was 13.5.

Battery 5

A non-aqueous electrolyte secondary battery was produced using the same materials and processes as Battery 1, except that the amount of the thickening agent A1 was 0.1 g.

Battery 6

A non-aqueous electrolyte secondary battery was produced using the same materials and processes as Battery 1, except that the amount of the thickening agent A1 was 0.7 g.

Battery 7

A non-aqueous electrolyte secondary battery was produced using the same materials and processes as Battery 1, except that the amount of the thickening agent A1 was 1 g.

Battery 8

A non-aqueous electrolyte secondary battery was produced using the same materials and processes as Battery 1, except that the amount of the binder A was 0.2 g and the amount of the thickening agent A1 was 0.2 g.

Battery 9

A non-aqueous electrolyte secondary battery was produced using the same materials and processes as Battery 1, except for using 1 g of PVDF in place of 0.4 g of the binder A. The active material density of the positive electrode mixture layer was 3.57 g/ml.

Battery 10

A non-aqueous electrolyte secondary battery was produced using the same materials and processes as Battery 1, except that the amount of acetylene black was 1 g.

Battery 11

A non-aqueous electrolyte secondary battery was produced using the same materials and processes as Battery 1, except that the amount of acetylene black was 3 g.

Battery 12

A non-aqueous electrolyte secondary battery was produced using the same materials and processes as Battery 1, except that the active material density of the positive electrode mixture layer was 3.85 g/ml.

Battery 13

A non-aqueous electrolyte secondary battery was produced using the same materials and processes as Battery 1, except that the active material density of the positive electrode mixture layer was 3.80 g/ml.

Battery 14

A non-aqueous electrolyte secondary battery was produced using the same materials and processes as Battery 1, except that the active material density of the positive electrode mixture layer was 3.55 g/ml.

Battery 15

An attempt was made to produce a non-aqueous electrolyte secondary battery using the same materials and processes as Battery 1, except for using a copolymer (hereinafter referred to as thickening agent A5) in which the ratio of the $—(CH_2)_n—$ portion to the acrylonitrile unit was adjusted such that the solubility parameter δ was 7.9. However, the paste C1 was nonuniform and had little flowability, making it impossible to produce a positive electrode plate. Consequently, a non-aqueous electrolyte secondary battery could not be produced.

Battery 16

A non-aqueous electrolyte secondary battery was produced using the same materials and processes as Battery 1, except for using a copolymer (hereinafter referred to as thickening agent A6) in which the ratio of the $—(CH_2)_n—$ portion to the acrylonitrile unit was adjusted such that the solubility parameter δ was 14.2.

Battery 17

An attempt was made to produce a non-aqueous electrolyte secondary battery using the same materials and processes as Battery 1, except that the amount of the thickening agent A1 was 0.05 g. However, the paste C1 was nonuniform and had little flowability, making it impossible to produce a positive electrode plate. Consequently, a non-aqueous electrolyte secondary battery could not be produced.

Battery 18

A non-aqueous electrolyte secondary battery was produced using the same materials and processes as Battery 1, except that the amount of the binder A was 1 g and the amount of the thickening agent A1 was 1 g.

Battery 19

A non-aqueous electrolyte secondary battery was produced using the same materials and processes as Battery 1, except that the amount of the thickening agent A1 was 1.2 g.

Battery 20

A non-aqueous electrolyte secondary battery was produced using the same materials and processes as Battery 1, except that the amount of acetylene black was 0.5 g.

Battery 21

A non-aqueous electrolyte secondary battery was produced using the same materials and processes as Battery 1, except that the amount of acetylene black was 4 g.

Battery 22

A non-aqueous electrolyte secondary battery was produced using the same materials and processes as Battery 1, except that the active material density of the positive electrode mixture layer was 3.90 g/ml.

Battery 23

A non-aqueous electrolyte secondary battery was produced using the same materials and processes as Battery 1, except that the active material density of the positive electrode mixture layer was 3.50 g/ml.

Battery 24

A non-aqueous electrolyte secondary battery was produced using the same materials and processes as Battery 1, except for using 3 g of PVDF in place of 0.4 g of the binder A, while omitting the use of the thickening agent. The active material density of the positive electrode mixture layer was 3.4 g/ml.

Battery 25

A non-aqueous electrolyte secondary battery was produced using the same materials and processes as Battery 1, except that the amount of the binder A was 0.1 g and the amount of the thickening agent A1 was 0.2 g.

Battery 26

A non-aqueous electrolyte secondary battery was produced using the same materials and processes as Battery 1, except for using 0.4 g of a acrylic resin (hereinafter referred to as thickening agent B) having a hydroxyl group as its side chain in place of 0.4 g of the thickening agent A1. The active material density of the positive electrode mixture layer was 3.65 g/ml. Herein, the solubility parameter δ of the thickening agent B was 14.

Battery 27

A non-aqueous electrolyte secondary battery was produced using the same materials and processes as Battery 1, except for using 1 g of PVDF in place of 0.4 g of the binder A and using 0.4 g of the thickening agent B in place of 0.4 g of the thickening agent A1. The active material density of the positive electrode mixture layer was 3.57 g/ml.

TABLE 1 shows the detailed information of Batteries 1 to 27.

(2) Separation of Positive Electrode Mixture Layer

Immediately after the application of the paste C1 to the positive electrode current collector, the electrode plate, prior to being pressed, was observed to examine whether or not the positive electrode mixture layer was separated therefrom. The results are shown in TABLE 2.

(3) The Initial Capacity of Battery

Each of the batteries was charged at a constant current of 380 mA until the battery voltage reached 4.2 V, and then discharged at a constant current of 380 mA until the battery voltage reached 3.0 V. This charge/discharge cycle was repeated 10 times. Both the charging and discharging were performed in a constant temperature bath at 20° C. Then, the discharge capacity obtained at the 10th cycle was taken as the initial capacity. The results are shown in TABLE 2.

Herein, each of the batteries had an initial capacity close to 750 mA, which was the designed capacity.

(4) High-Rate Discharge Characteristic

Each of the batteries was charged at a constant current of 750 mA until the battery voltage reached 4.2 V, and then discharged at a constant current of 150 mA until the battery voltage reached 3.0 V. Each of the batteries was also charged at a constant current of 750 mA until the battery voltage reached 4.2 V, and then discharged at a constant current of 1500 mA until the battery voltage reached 3.0 V. The ratio

TABLE 1

| Battery | Binder | Amount of Binder (g) | Thickening agent | Amount of thickening agent (g) | Median size (μm) | Amount of conductive agent (g) | δ value of thickening agent |
|---|---|---|---|---|---|---|---|
| 1 | A | 0.4 | A1 | 0.4 | 0.5 | 2 | 9.5 |
| 2 | A | 0.4 | A2 | 0.4 | 0.5 | 2 | 8.3 |
| 3 | A | 0.4 | A3 | 0.4 | 0.5 | 2 | 11.3 |
| 4 | A | 0.4 | A4 | 0.4 | 0.5 | 2 | 13.5 |
| 5 | A | 0.4 | A1 | 0.1 | 0.5 | 2 | 9.5 |
| 6 | A | 0.4 | A1 | 0.7 | 0.5 | 2 | 9.5 |
| 7 | A | 0.4 | A1 | 1 | 0.5 | 2 | 9.5 |
| 8 | A | 0.2 | A1 | 0.2 | 0.5 | 2 | 9.5 |
| 9 | PVDF | 1 | A1 | 0.4 | 0.5 | 2 | 9.5 |
| 10 | A | 0.4 | A1 | 0.4 | 0.5 | 1 | 9.5 |
| 11 | A | 0.4 | A1 | 0.4 | 0.5 | 3 | 9.5 |
| 12 | A | 0.4 | A1 | 0.4 | 0.5 | 2 | 9.5 |
| 13 | A | 0.4 | A1 | 0.4 | 0.5 | 2 | 9.5 |
| 14 | A | 0.4 | A1 | 0.4 | 0.5 | 2 | 9.5 |
| 15 | A | 0.4 | A5 | 0.4 | 0.5 | 2 | 7.9 |
| 16 | A | 0.4 | A6 | 0.4 | 0.5 | 2 | 14.2 |
| 17 | A | 0.4 | A1 | 0.05 | 0.5 | 2 | 9.5 |
| 18 | A | 1 | A1 | 1 | 0.5 | 2 | 9.5 |
| 19 | A | 0.4 | A1 | 1.2 | 0.5 | 2 | 9.5 |
| 20 | A | 0.4 | A1 | 0.4 | 0.5 | 0.5 | 9.5 |
| 21 | A | 0.4 | A1 | 0.4 | 0.5 | 4 | 9.5 |
| 22 | A | 0.4 | A1 | 0.4 | 0.5 | 2 | 9.5 |
| 23 | A | 0.4 | A1 | 0.4 | 0.5 | 2 | 9.5 |
| 24 | PVDF | 3 | — | — | 0.5 | 2 | — |
| 25 | A | 0.1 | A1 | 0.2 | 0.5 | 2 | 9.5 |
| 26 | A | 0.4 | B | 0.4 | 0.5 | 2 | 14 |
| 27 | PVDF | 1 | B | 0.4 | 0.5 | 2 | 14 |

The following evaluation was made on each of the above-described batteries and the paste C1 used for the production of the batteries.

(1) Application of Paste C1

The state of the paste C1, obtained by mixing the paste A1 with paste B1, was observed to examine whether or not the paste C1 could be applied to the positive electrode current collector. When the paste C1 could be applied to the positive electrode current collector, a positive electrode plate was produced, and the active material density of the positive electrode mixture layer was determined. The results are shown in TABLE 2. Herein, "-" in the column showing the active material density in TABLE 2 indicates that a positive electrode plate could not be produced.

of the capacity obtained by the discharging at 1500 mA to the capacity obtained by the discharging at 150 mA was determined in percentage. Both the charging and discharging were performed in a constant temperature bath at 20° C. The results are shown in TABLE 2.

(5) Capacity Retention Rate

Each of the batteries was charged at a constant current of 750 mA until the battery voltage reached 4.2 V, and then discharged at a constant current of 750 mA until the battery voltage reached 3.0 V. This charge/discharge cycle was repeated 400 times. Then, the ratio of the discharge capacity obtained at the 400th cycle to the discharge capacity obtained at the first cycle was determined in percentage. Both the charging and discharging were performed in a constant temperature bath at 20° C. The results are shown in TABLE 2.

(6) Amount of Gas Generation

Each of the batteries was stored for three days in a constant temperature bath at 85° C. Thereafter, the gas generated inside the battery was fed into a laminate tube and then used to determine the composition and amount of the gas by gas chromatography. The amounts of the generated gas are shown in TABLE 2.

TABLE 2

| Battery | Application of paste C1 | Active material density (g/ml) | Separation of mixture layer | Initial capacity (mAh) | High-rate discharge characteristic (%) | Capacity retention rate (%) | Amount of gas (ml) |
|---|---|---|---|---|---|---|---|
| 1  | Yes | 3.65 | No  | 752 | 91 | 84 | 0.5 |
| 2  | Yes | 3.65 | No  | 752 | 90 | 83 | 0.3 |
| 3  | Yes | 3.65 | No  | 752 | 91 | 83 | 0.6 |
| 4  | Yes | 3.65 | No  | 752 | 90 | 83 | 0.9 |
| 5  | Yes | 3.65 | No  | 758 | 92 | 78 | 0.5 |
| 6  | Yes | 3.65 | No  | 747 | 91 | 85 | 0.5 |
| 7  | Yes | 3.65 | No  | 741 | 90 | 84 | 0.6 |
| 8  | Yes | 3.65 | No  | 760 | 91 | 78 | 0.4 |
| 9  | Yes | 3.57 | No  | 744 | 90 | 82 | 0.5 |
| 10 | Yes | 3.65 | No  | 768 | 92 | 77 | 0.5 |
| 11 | Yes | 3.65 | No  | 738 | 90 | 84 | 0.5 |
| 12 | Yes | 3.85 | No  | 779 | 79 | 86 | 0.5 |
| 13 | Yes | 3.8  | No  | 767 | 82 | 85 | 0.5 |
| 14 | Yes | 3.55 | No  | 737 | 93 | 76 | 0.5 |
| 15 | No  | —    | —   | —   | —  | —  | —   |
| 16 | Yes | 3.65 | No  | 752 | 92 | 83 | 2.1 |
| 17 | No  | —    | —   | —   | —  | —  | —   |
| 18 | Yes | 3.65 | No  | 735 | 81 | 73 | 0.4 |
| 19 | Yes | 3.65 | No  | 741 | 80 | 74 | 0.5 |
| 20 | Yes | 3.65 | No  | 775 | 89 | 71 | 0.4 |
| 21 | Yes | 3.65 | No  | 724 | 93 | 83 | 0.4 |
| 22 | Yes | 3.9  | No  | 787 | 68 | 88 | 0.5 |
| 23 | Yes | 3.5  | No  | 729 | 93 | 69 | 0.5 |
| 24 | Yes | 3.4  | No  | 738 | 80 | 81 | 0.5 |
| 25 | Yes | —    | Yes | —   | —  | —  | —   |
| 26 | Yes | 3.65 | No  | 751 | 90 | 85 | 2.3 |
| 27 | Yes | 3.57 | No  | 744 | 90 | 82 | 2.2 |

In TABLE 2, comparisons of Batteries 1, 9, 24, 26 and 27 demonstrate the following. In the case of Battery 24, which used a conventional PVDF as the binder while omitting the use of the thickening agent, it was difficult to increase the battery capacity and, moreover, various properties of the battery were easy to deteriorate. This was presumably because the surface of the positive electrode active material was coated with PVDF. Batteries 26 and 27, which used the thickening agent B, underwent significant swelling. The reason was that the hydrophilicity of the thickening agent B was so high that water was taken into the battery. Such water was difficult to be removed during the application step or the subsequent drying step, and therefore remained inside the positive electrode plate even after the fabrication of the battery. This is considered to have caused the generation of hydrogen gas at the negative electrode side during charging, resulting in the swelling of the battery. In contrast, Batteries 1 and 9, which used the thickening agent A1, had a low amount of gas generation. In addition, the reason that Battery 1 had a higher capacity and a higher capacity retention rate than Battery 9 was that the binder A used in the Battery 1 comprised particles insoluble in NMP.

Comparisons of Batteries 1, 5 to 7, 17 and 19 demonstrate the following. In the case of Battery 17, which contained a small amount of the thickening agent, a sufficient thickening effect could not be achieved, so that the paste C1 was separated and thus could not be applied to the current collector. On the other hand, in the case of Battery 19, which contained a large amount of the thickening agent, the positive electrode active material was coated with too much thickening agent, resulting in degradation of the overall performance of the battery. Accordingly, the amount of the thickening agent is preferably 0.1 to 1 part by weight per 100 parts by weight of the positive electrode active material.

Comparisons of Batteries 1, 7, 8, 18 and 25 demonstrate the following. In the case of Battery 25, in which the total amount of the binder and the thickening agent was small, a sufficient cohesiveness was not achieved, so that the positive electrode mixture layer was likely to be separated. On the other hand, in the case of Battery 18, in which the total amount of the binder and the thickening agent was large, the positive electrode active material was coated with too much of these materials, resulting in degradation of the overall performance of the battery. Accordingly, the total amount of the binder and the thickening agent is preferably 0.4 to 1.4 parts by weight per 100 parts by weight of the positive electrode active material.

Comparisons of Batteries 1 to 4, 15 and 16 demonstrate the following. In the case of Battery 15, in which the solubility parameter δ of the thickening agent was too low, a sufficient thickening effect could not be achieved, so that the paste C1 was separated and thus could not be applied to the current collector. On the other hand, in the case of Battery 16, in which the solubility parameter δ of the thickening agent was too high, the thickening agent was likely to retain water, so that the amount of gas generation was increased during storage at high temperatures. Accordingly, the solubility parameter δ of the thickening agent is preferably 8.3 to 13.5.

Comparisons of Batteries 1, 10, 11, 20 and 21 demonstrate the following. Battery 20, which contained too small an amount of the conductive agent, had a reduced capacity retention rate. On the other hand, Battery 21, which contained too large an amount of the conductive agent, had a reduced capacity. Accordingly, the amount of the conductive agent is preferably 1 to 3 parts by weight per 100 parts by weight of the positive electrode active material.

Comparisons of Batteries 1, 12 to 14, 22 and 23 demonstrate the following. In the case of Battery 22, in which the active material density was too high, the electrolyte was difficult to permeate the positive electrode mixture layer, resulting in an inferior high-rate discharge characteristic. On the other hand, when the active material density was too low, an electroconductive network was not prone to be sufficiently formed in the mixture layer, thereby reducing the capacity retention rate and capacity of the battery.

EXAMPLE 2

In the following experiments, it was examined whether or not the paste C1 could be prepared, as well as the variation in the thickness of the positive electrode plate. Subsequently, each of the obtained batteries was evaluated for the initial capacity, capacity retention rate, amount of gas generation during storage and safety. In the following, the mean median size was measured by a particle size distribution analyzer.

Battery 28

A non-aqueous electrolyte secondary battery having the identical structure as Battery 1 of Example 1 was produced.

Battery 29

A non-aqueous electrolyte secondary battery was produced using the same materials and processes as Battery 1, except that, in the preparation of the paste $B_1$, the thickening agent A1 was mixed with acetylene black until the conductive agent had a mean median size of 0.2 μm.

Battery 30

A non-aqueous electrolyte secondary battery was produced using the same materials and processes as Battery 1, except that, in the preparation of the paste B1, the thickening agent A1 was mixed with acetylene black until the conductive agent had a mean median size of 1 μm.

Battery 31

A non-aqueous electrolyte secondary battery having the identical structure as Battery 10 of Example 1 was produced.

Battery 32

A non-aqueous electrolyte secondary battery having the identical structure as Battery 11 of Example 1 was produced.

Battery 33

A non-aqueous electrolyte secondary battery having the identical structure as Battery 5 of Example 1 was produced.

Battery 34

A non-aqueous electrolyte secondary battery having the identical structure as Battery 7 of Example 1 was produced.

Battery 35

A non-aqueous electrolyte secondary battery having the identical structure as Battery 2 of Example 1 was produced.

Battery 36

A non-aqueous electrolyte secondary battery having the identical structure as Battery 4 of Example 1 was produced.

Battery 37

A non-aqueous electrolyte secondary battery was produced using the same materials and processes as Battery 1, except that the amount of water contained in the paste C1 was adjusted to 500 ppm.

Battery 38

A non-aqueous electrolyte secondary battery was produced using the same materials and processes as Battery 1, except that the amount of water contained in the paste C1 was adjusted to 5000 ppm.

Battery 39

A non-aqueous electrolyte secondary battery was produced using the same materials and processes as Battery 1, except that the amount of water contained in the paste C1 was adjusted to 10000 ppm.

Battery 40

A non-aqueous electrolyte secondary battery was produced using the same materials and processes as Battery 1, except that, in the preparation of the paste B1, the thickening agent A1 was mixed with acetylene black until the conductive agent had a mean median size of 0.1 μm.

Battery 41

A non-aqueous electrolyte secondary battery was produced using the same materials and processes as Battery 1, except that, in the preparation of the paste B1, the thickening agent A1 was mixed with acetylene black until the conductive agent had a mean median size of 1.5 μm Battery 42

A non-aqueous electrolyte secondary battery having the identical structure as Battery 20 of Example 1 was produced.

Battery 43

A non-aqueous electrolyte secondary battery having the identical structure as Battery 21 of Example 1 was produced.

Battery 44

A non-aqueous electrolyte secondary battery having the identical structure as Battery 17 of Example 1 was produced.

Battery 45

A non-aqueous electrolyte secondary battery having the identical structure as Battery 19 of Example 1 was produced.

Battery 46

A non-aqueous electrolyte secondary battery was produced using the same materials and processes as Battery 1, except for using 0.4 g of polyethylene having a solubility parameter δ of 7.9 in place of 0.4 g of the thickening agent A1.

Battery 47

A non-aqueous electrolyte secondary battery was produced using the same materials and processes as Battery 1, except for using 0.4 g of polyacrylonitrile having a solubility parameter δ of 14 in place of 0.4 g of the thickening agent A1.

Battery 48

A non-aqueous electrolyte secondary battery was produced using the same materials and processes as Battery 1, except that the amount of water contained in the paste C1 was adjusted to 15000 ppm.

Battery 49

A non-aqueous electrolyte secondary battery having the identical structure as Battery 24 of Example 1 was produced.

TABLE 3 shows the detailed information of Batteries 28 to 49.

TABLE 3

| Battery | Binder | Amount of Binder (g) | Thickening agent | Amount of thickening agent (g) | Median size (μm) | Amount of conductive agent (g) | δ value of thickening agent | Water content of paste C1 (ppm) |
|---|---|---|---|---|---|---|---|---|
| 28 | A | 0.4 | A1 | 0.4 | 0.5 | 2 | 9.5 | 3000 |
| 29 | A | 0.4 | A1 | 0.4 | 0.2 | 2 | 9.5 | 3000 |
| 30 | A | 0.4 | A1 | 0.4 | 1 | 2 | 9.5 | 3000 |
| 31 | A | 0.4 | A1 | 0.4 | 0.5 | 1 | 9.5 | 3000 |
| 32 | A | 0.4 | A1 | 0.4 | 0.5 | 3 | 9.5 | 3000 |
| 33 | A | 0.4 | A1 | 0.1 | 0.5 | 2 | 9.5 | 3000 |
| 34 | A | 0.4 | A1 | 1 | 0.5 | 2 | 9.5 | 3000 |
| 35 | A | 0.4 | A2 | 0.4 | 0.5 | 2 | 8.3 | 3000 |
| 36 | A | 0.4 | A4 | 0.4 | 0.5 | 2 | 13.5 | 3000 |
| 37 | A | 0.4 | A1 | 0.4 | 0.5 | 2 | 9.5 | 500 |
| 38 | A | 0.4 | A1 | 0.4 | 0.5 | 2 | 9.5 | 5000 |
| 39 | A | 0.4 | A1 | 0.4 | 0.5 | 2 | 9.5 | 10000 |
| 40 | A | 0.4 | A1 | 0.4 | 0.1 | 2 | 9.5 | 3000 |
| 41 | A | 0.4 | A1 | 0.4 | 1.5 | 2 | 9.5 | 3000 |
| 42 | A | 0.4 | A1 | 0.4 | 0.5 | 0.5 | 9.5 | 3000 |
| 43 | A | 0.4 | A1 | 0.4 | 0.5 | 4 | 9.5 | 3000 |
| 44 | A | 0.4 | A1 | 0.05 | 0.5 | 2 | 9.5 | 3000 |
| 45 | A | 0.4 | A1 | 1.2 | 0.5 | 2 | 9.5 | 3000 |
| 46 | A | 0.4 | Polyethylene | 0.4 | 0.5 | 2 | 7.9 | 3000 |
| 47 | A | 0.4 | Poly-acrylonitrile | 0.4 | 0.5 | 2 | 14 | 3000 |
| 48 | A | 0.4 | A1 | 0.4 | 0.5 | 2 | 9.5 | 15000 |
| 49 | PVDF | 3 | — | — | 0.5 | 2 | — | 3000 |

The following evaluation was made on each of the above-described batteries and the paste C1 used for the fabrication of the batteries.
(1) Application of Paste C1

The state of the paste C1, obtained by mixing the paste A1 with paste B1, was observed to examine whether or not the paste C1 could be applied to the positive electrode current collector. The results are shown in TABLE 4.
(2) Variation in Thickness of Positive Electrode Plate The positive electrode plate was divided into 33 sections in a grid-like pattern. The thickness of the electrode plate was measured at the intersection points (20 in total) of the lines dividing the electrode plate. The variation in the thickness thus obtained was expressed in terms of the standard deviation σ (%). The results are shown in TABLE 4.
(3) The Initial Capacity of Battery Each of the batteries was charged at a constant current of 380 mA until the battery voltage reached 4.2 V, and then discharged at a constant current of 380 mA until the battery voltage reached 3.0 V. This charge/discharge cycle was repeated 10 times. Both the charging and discharging were performed in a constant temperature bath at 20° C. Then, the discharge capacity obtained at the 10th cycle was taken as the initial capacity. The results are shown in TABLE 4.

Herein, each of the batteries had an initial capacity close to 750 mA, which was the designed capacity.
(4) Capacity Retention Rate Each of the batteries was charged at a constant current of 750 mA until the battery voltage reached 4.2 V, and then discharged at a constant current of 750 mA until the battery voltage reached 3.0 V. This charge/discharge cycle was repeated 400 times. Then, the ratio of the discharge capacity obtained at the 400th cycle to the discharge capacity obtained at the first cycle was determined in percentage. Both the charging and discharging were performed in a constant temperature bath at 20° C. The results are shown in TABLE 4.
(5) Amount of Gas Generation Each of the batteries was stored for three days in a constant temperature bath at 85° C. Thereafter, the gas generated inside the battery was fed into a laminate tube and then used to determine the composition and amount of the gas by gas chromatography. The amounts of the generated gas are shown in TABLE 4.
(6) Safety Each of the batteries was charged at a constant current of 3 C until an overcharged state was reached, and the charging was terminated when the surface temperature of the battery reached 80° C. Thereafter, the batteries of which surface temperatures had only increased to less than 90° C., were evaluated to have a satisfactory safety level. On the other hand, the batteries of which surface temperatures had increased to 90° C. or higher, were evaluated to have an unsatisfactory safety level. The results are shown in TABLE 4.

TABLE 4

| Battery | Application of paste C1 | Thickness variation (%) | Initial capacity (mAh) | Capacity retention rate (%) | Amount of gas (ml) | Safety |
|---|---|---|---|---|---|---|
| 28 | Yes | 0.29 | 752 | 80 | 0.5 | Satisfactory |
| 29 | Yes | 0.31 | 752 | 84 | 0.6 | Satisfactory |
| 30 | Yes | 0.41 | 752 | 83 | 0.5 | Satisfactory |
| 31 | Yes | 0.30 | 768 | 77 | 0.5 | Satisfactory |
| 32 | Yes | 0.35 | 738 | 84 | 0.6 | Satisfactory |
| 33 | Yes | 0.33 | 758 | 78 | 0.5 | Satisfactory |
| 34 | Yes | 0.31 | 741 | 84 | 0.6 | Satisfactory |

TABLE 4-continued

| Battery | Application of paste C1 | Thickness variation (%) | Initial capacity (mAh) | Capacity retention rate (%) | Amount of gas (ml) | Safety |
|---|---|---|---|---|---|---|
| 35 | Yes | 0.44 | 752 | 83 | 0.3 | Satisfactory |
| 36 | Yes | 0.23 | 752 | 83 | 0.9 | Satisfactory |
| 37 | Yes | 0.27 | 752 | 82 | 0.4 | Satisfactory |
| 38 | Yes | 0.51 | 752 | 81 | 0.5 | Satisfactory |
| 39 | Yes | 0.62 | 752 | 77 | 0.5 | Satisfactory |
| 40 | Yes | 0.24 | 752 | 71 | 0.4 | Satisfactory |
| 41 | Yes | 2.1 | 752 | 72 | 0.5 | Unsatisfactory |
| 42 | Yes | 0.29 | 775 | 71 | 0.4 | Satisfactory |
| 43 | Yes | 0.36 | 724 | 83 | 0.4 | Satisfactory |
| 44 | No | — | 761 | — | — | — |
| 45 | Yes | 0.31 | 741 | 74 | 0.5 | Satisfactory |
| 46 | No | — | 775 | — | — | — |
| 47 | Yes | 0.22 | 775 | 83 | 2.2 | Satisfactory |
| 48 | Yes | 3.6 | 775 | 79 | 0.8 | Unsatisfactory |
| 49 | Yes | 0.28 | 738 | 81 | 0.5 | Satisfactory |

TABLE 4 demonstrates the following.

Battery 49, which used PVDF as the binder, had a reduced initial capacity. The reason was as follows. In order for PVDF to sufficiently function as the binder, it had to be added in a large amount to the positive electrode mixture. As a result, the active material was coated with too much PVDF to reduce its reactivity. On the other hand, most of the batteries which used the binder A comprising rubber particles, had a higher capacity than Batteries using PVDF. Herein, a special attention must be given to the selection of the thickening agent.

In the case of Battery 47, which used polyacrylonitrile having a high value of the solubility parameter δ as the thickening agent, a large amount of gas was generated inside the battery. This was because the hydrophilicity of polyacrylonitrile was so high that water was likely to be taken into the positive electrode. Herein, gas chromatography analysis showed that the collected gas contained 1.5 ml of hydrogen gas, which was equivalent to 70% of the total amount of the gas. This also demonstrates that the decomposition of water retained in the thickening agent was the major cause of gas generation.

In contrast, in the case of Battery 46, which used polyethylene having a low value of solubility parameter δ as the thickening agent, the paste C1 was difficult to be prepared and thus could not be applied to the positive electrode current collector. The reason was that polyethylene having a low value of solubility parameter δ was difficult to be dissolved in NMP, and therefore was not able to give a sufficient thickening effect. These results show that the thickening agent preferably has a solubility parameter δ of 8.3 to 13.5.

In the case of Battery 44, which contained a small amount of the thickening agent, it was difficult to prepare the paste C1 as well as applying it to the positive electrode current collector. On the other hand, in the case of Battery 45, which contained a large amount of the thickening agent, the active material was coated with too much thickening agent to reduce its reactivity, resulting in a reduced capacity retention rate. This shows that the amount of the thickening agent is preferably 0.1 to 1 part by weight per 100 parts by weight of the positive electrode active material.

The thickening agent having a solubility parameter δ of 8.3 to 13.5 had a poor dispersibility in NMP than the acrylic resin. Previously mixing the thickening agent with the conductive agent also provided an effect of improving the dispersibility in NMP of the thickening agent. Specifically, as shown from Batteries 28 to 30, it was effective to previously mix the thickening agent with the conductive agent until the conductive agent had a mean median size of 0.2 to 1 μm. In the case of Battery 41, in which the mean median size of the conductive agent was large, i.e., the conductive agent had an insufficient dispersibility, the dispersibility in NMP of the thickening agent was reduced, and variation was likely to occur in the thickness of the positive electrode plate, which was obtained by applying the paste C1 to the current collector.

A great variation in the thickness of the positive electrode plate had an adverse effect on the negative electrode facing the positive electrode. At the part of the negative electrode facing the part of the positive electrode having a large thickness, lithium, which was not absorbed by carbon material as the negative electrode material, was easy to deposit. The deposited lithium may in some cases reduce the capacity retention rate or may induce heating of the battery. However, in the case of Battery 40, in which the mean median size of the conductive agent was too small, the conductive agent was not able to sufficiently form an electroconductive network, so that the capacity retention rate was reduced, rather than being improved.

In the case of Battery 42, which contained a small amount of the conductive agent, the conductivity of the positive electrode was insufficient, resulting in a reduced capacity retention rate. On the other hand, Battery 43, which contained too large an amount of the conductive agent, had a reduced capacity. This demonstrates that the amount of the conductive agent is preferably 1 to 3 parts by weight per 100 parts by weight of the positive electrode active material.

In addition to controlling the state of the dispersibility of the conductive agent contained in the paste, as well as the solubility parameter δ and amount of the thickening agent within a proper range as described above, it was also important to manage the amount of water contained in the paste. When the amount of the water contained in the paste is large, the conductive agent was flocculated to rapidly increase the viscosity of the paste, thereby causing a problem during the application of the paste to the positive electrode current collector. In the case of Battery 48, which used the paste containing a large amount of water, the conductive agent was re-flocculated in the paste, thereby making it difficult to uniformly apply the paste to the positive electrode current collector. This resulted in reduction of the capacity retention rate and safety of the battery. Therefore, the water management was also important where the solubility parameter of the thickening agent was controlled as in the present invention. As shown from Battery 38 and Battery 39, a battery having a high capacity retention rate could be produced, by controlling the amount of water contained in the paste at not more than 10000 ppm, more preferably at not more than 5000 ppm, As described above, the present invention provides a non-aqueous electrolyte secondary battery having a high capacity with reduced gas generation. More specifically, with the use of a specific thickening agent, it is possible to provide a battery having a high capacity and containing a small amount of water. Moreover, with the use of a specific binder comprising rubber particles, it is possible to provide a battery having an even higher capacity. Further, it is possible to provide a positive electrode plate containing a small amount of water and having a uniform weight distribution, by previously mixing the conductive agent with the thickening agent until the conductive agent has a mean median size of 0.2 to 1 μm in the production process of the positive electrode.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A positive electrode for a non-aqueous electrolyte secondary battery, comprising:

a positive electrode mixture layer; and a positive electrode current collector which carries said positive electrode mixture layer, said positive electrode mixture layer comprising: at least one positive electrode active material; at least one conductive agent; at least one binder; and at least one thickening agent, said thickening agent comprising a polymer containing at least one acrylonitrile unit and at least one —$(CH2)_n$— structure portion where $6 \leq n$, wherein said thickening agent has a solubility parameter δ at 25° C. of not less than 8.3 and not more than 13.5, said parameter being defined by the equation:

$$\delta = (\Delta H/V)^{1/2}$$

where ΔH is a molar heat of vaporization and V is a molar volume; and wherein the amount of said thickening agent contained in said positive electrode mixture layer is not less than 0.1 part by weight and not more than 1 part by weight per 100 parts by weight of said positive electrode active material.

2. The positive electrode for a non-aqueous electrolyte secondary battery in accordance with claim 1, wherein said binder is a particulate binder comprising a cross-linked polymer.

3. The positive electrode for a non-aqueous electrolyte secondary battery in accordance with claim 1, wherein the total amount of said binder and said thickening agent contained in said positive electrode mixture layer is not less than 0.4 part by weight and not more than 1.4 parts by weight per 100 parts by weight of said positive electrode active material.

4. The positive electrode for a non-aqueous electrolyte secondary battery in accordance with claim 1, wherein the amount of said conductive agent contained in said positive electrode mixture layer is not less than 1 part by weight and not more than 3 parts by weight per 100 parts by weight of said positive electrode active material.

5. The positive electrode for a non-aqueous electrolyte secondary battery in accordance with claim 1, wherein an active material density, which is calculated by dividing the amount of said positive electrode active material contained in said positive electrode mixture layer by the volume of said positive electrode mixture layer, is not less than 3.45 g/ml and not more than 3.85 g/ml.

6. A non-aqueous electrolyte secondary battery, comprising: the positive electrode in accordance with claim 1; a negative electrode; a separator interposed between said positive electrode and negative electrode; and a non-aqueous electrolyte.

7. A method of producing a positive electrode for a non-aqueous electrolyte secondary battery, said method comprising the steps of:

(1) mixing at least one positive electrode active material, at least one binder and at least one dispersion medium to give a paste A;

(2) mixing at least one conductive agent, at least one thickening agent and at least one dispersion medium to give a paste B wherein said conductive agent is dispersed to have a mean median size of not less than 0.2 μm and not more than 1 μm;

(3) mixing said paste A with said paste B to give a paste C; and (4) applying said paste C to a positive electrode current collector to form an electrode plate, wherein said thickening agent comprises a polymer containing at least one acrylonitrile unit and at least one —$(CH_2)_n$— structure portion where $6 \leq n$:

the amount of said thickening agent contained in said paste C is not less than 0.1 part by weight and not more than 1 part by weight per 100 parts by weight of said positive electrode active material: and said thickening agent has a solubility parameter δ at 25° C. of not less than 8.3 and not more than 13.5, said parameter being defined by the equation:

$$\delta = (\Delta H/V)^{1/2}$$

where ΔH is a molar heat of vaporization and V is a molar volume.

8. The method of producing a positive electrode for a non-aqueous electrolyte secondary battery in accordance with claim 7, wherein said binder is a particulate binder comprising a cross-linked polymer.

9. The method of producing a positive electrode for a non-aqueous electrolyte secondary battery in accordance with claim 7, wherein the amount of said conductive agent contained in said paste C is not less than 1 part by weight and not more than 3 parts by weight per 100 parts by weight of said positive electrode active material.

10. The method of producing a positive electrode for a non-aqueous electrolyte secondary battery in accordance with claim 7, wherein the amount of water contained in said paste C is not more than 10000 ppm.

* * * * *